United States Patent [19]

Kao et al.

[11] Patent Number: 4,999,327
[45] Date of Patent: Mar. 12, 1991

[54] CATALYST FOR REGULATING THE MOLECULAR WEIGHT DISTRIBUTION OF ETHYLENE POLYMERS

[75] Inventors: Sun-Chueh Kao, Piscataway; Frederick J. Karol, Belle Mead, both of N.J.

[73] Assignee: Union Carbide Chemicals and Plastics Company Inc., Danbury, Conn.

[21] Appl. No.: 292,268

[22] Filed: Dec. 30, 1988

[51] Int. Cl.$^5$ ................................................ C08F 4/68
[52] U.S. Cl. ................................ 502/119; 502/120; 502/125; 526/128
[58] Field of Search ................ 502/119, 120, 125

[56] References Cited

U.S. PATENT DOCUMENTS

| | | | |
|---|---|---|---|
| 4,451,688 | 5/1984 | Kuroda et al. | 502/125 X |
| 4,508,842 | 4/1985 | Beran et al. | 502/119 X |
| 4,525,552 | 6/1985 | Kuroda et al. | 502/125 X |
| 4,550,094 | 10/1985 | Hanji et al. | 502/125 X |

FOREIGN PATENT DOCUMENTS 62-25112  2/1987  Japan .

*Primary Examiner*—Patrick P. Garvin
*Attorney, Agent, or Firm*—John S. Piscitello

[57] ABSTRACT

A vanadium-based catalyst is treated with certain silicon-containing compounds as a means of narrowing and effectively regulating the molecular weight distribution of the polymers produced with the catalyst.

18 Claims, No Drawings

CATALYST FOR REGULATING THE MOLECULAR WEIGHT DISTRIBUTION OF ETHYLENE POLYMERS

FIELD OF THE INVENTION

This invention relates to a vanadium-based catalyst sutable for regulating the molecular weight distribution of ethylene polymers.

BACKGROUND OF THE INVENTION

U.S. Pat. No. 4,508,842 discloses a highly active vanadium-containing catalyst capable of producing ethylene polymers having a broad molecular weight distribution. Said catalyst comprises:
(A) a solid catalyst precursor consisting essentially of
  (1) an inorganic carrier, as support for
  (2) the reaction product of (a) a vanadium trihalide and (b) an electron donor, and
  (3) a boron halide or alkyl-aluminum modifier,
(B) an alkylaluminum cocatalyst, and
(C) a halohydrocarbon polymerization promoter.

The polymers produced in accordance with U.S. Pat. No. 4,508,842 have a relatively broad molecular weight distribution, and excellent extrudability. These properties render them extremely useful in a wide variety of applications, such as wire and cable insulation, blow molding, film, and pipe fabrication. However, such polymers cannot be used in other applications, such as injection molding, which require a narrower molecular weight distribution.

Japanese Public Disclosure No. 62-25112 (Application Ser. No. 60-163525), on the other hand, discloses vanadium-containing catalyst compositions useful in the preparation of ethylene polymers having a narrow molecular weight distribution. Such compositions consist of:
(1) a solid catalyst component obtained by precipitating vanadium trihalide from an ether solution onto a silica and/or alumina carrier and then treating the product with an alkylaluminum,
(2) an alkylaluminum,
(3) an alkyl halide, and
(4) an alkoxy compound of silicon.

While the catalyst compositions prepared in this manner have been found useful in the preparation of polymers having a narrow molecular weight distribution, the presence of alkoxysilicon compounds in such compositions has been found to adversely affect polymer productivity.

SUMMARY OF THE INVENTION

In accordance with the present invention, it has now been discovered that the molecular weight distribution of ethylene polymers produced employing a vanadium based catalyst system comprising:
(A) a solid catalyst precursor consisting essentially of
  (1) a solid, particulate, porous, inorganic carrier, as support for
  2) the reaction product of (a) a vanadium trihalide and (b) an electron donor, and
  (3) a boron halide or alkyl-aluminum modifier,
(B) an alkylaluminum cocatalyst, and
(C) a halohydrocarbon polymerization promoter,
can be narrowed and effectively regulated within a wide range by treating catalyst component (A) with varying amounts of a silicon-containing compound having the formula:

$$(RO)_n SiR^1_{(4-n)}$$

wherein:
R is a monovalent hydrocarbon radical free of aliphatic unsaturation containing from 1 to 14 carbon atoms,
$R^1$ is a monovalent hydrocarbon radical free of aliphatic unsaturation containing from 1 to 14 carbon atoms, and
n is an integer having a value of from 1 to 4.

Thus, the catalyst system of the present invention comprises:
(A) a solid catalyst precursor consisting essentially of
  (1) a solid, particulate, porous, inorganic carrier, as support for
  (2) the reaction product of (a) a vanadium trihalide and (b) an electron donor,
  (3) a boron halide or alkyl-aluminum modifier, and
  (4) an silicon-containing molecular weight distribution (MWD) regulator having the formula $(RO)_n SiR^1_{(4-n)}$, wherein R, $R^1$ and n are as defined above,
(B) an alkylaluminum cocatalyst, and
(C) a halohydrocarbon polymerization promoter.

DETAILED DESCRIPTION OF THE INVENTION

As a result of the present invention, it is now possible to effectively regulate the molecular weight distribution (MWD) of ethylene polymers produced by means of a vanadium-containing catalyst system within a wide range by varying the amount of silicon-containing compound $(RO)_n SiR^1_{(4-n)}$ employed in the preparation of said catalyst system. Surprisingly, the catalyst systems containing these silicon-containing MWD regulators have been found to be significantly more active than like untreated catalyst systems. As a result, it is possible to produce ethylene polymers by means of these catalyst systems having narrow-to-intermediate molecular weight distributions at enhanced levels of catalyst activity and polymer productivity. By the effective use these silicon-containing MWD regulators together with a suitable chain transfer agent, such as hydrogen, to control the molecular weight of the polymers, it is now possible, by means of this system, to tailor polymer properties for use in a wide variety of applications.

The polymers produced with the catalyst system of the present invention have a molecular weight distribution (MWD), defined as the ratio of weight average molecular weight to number average molecular weight ($M_w/M_n$), of less than 20 to as low as 4. Another means of indicating the molecular weight distribution of a polymer is by the melt flow ratio (MFR) of that polymer. By melt flow ratio is meant the flow index : melt index ratio of the polymer, wherein flow index and melt index are determined in accordance with ASTM D-1238, Conditions F and E, respectively. The polymers produced with the catalyst system of the present invention have a melt flow ratio of less than 120 to as low as 30. For these polymers, such MFR values correspond to the $M_w/M_n$ values set forth above.

The polymers produced with the catalyst system of the present invention have a melt index of from greater than 0 g/10 minutes to about 500 g/10 minutes, usually of from about 0.1 g/10 minutes to about 100 g/10 minutes. The melt index of a polymer varies inversely with the molecular weight of the polymer, and is a function of the hydrogen/monomer ratio employed during preparation of the polymer.

As indicated above, both the molecular weight and the molecular weight distribution of the polymers can vary widely depending upon the amount of silicon-containing MWD regulator present in the catalyst system employed to produce such polymers and the amount of chain transfer agent present during polymerization. As a result, a broad variety of polymers having widely varying properties can be produced.

The polymers produced with the catalyst system of the present invention are also characterized by a density of from about 0.86 g/cm$^3$ to about 0.96 g/cm$^3$. Such polymers generally contain at least 50 mol percent of polymerized ethylene and no more than 50 mol percent of polymerized alpha olefin containing from 3 to 8 carbon atoms and, optionally, polymerized diene. When polymerized diene is present, the polymer ordinarily contains from 0.01 mol percent to 10 mol percent of at least one such diene, from 6 mol percent to 55 mol percent of at least one polymerized alpha olefin containing from 3 to 8 carbon atoms, and from 35 mol percent to 94 mol percent of polymerized ethylene.

Catalyst component (A) consists essentially of:
(1) a solid, particulate, porous, inorganic carrier, as support for
(2) the reaction product of (a) a vanadium trihalide and (b) an electron donor,
(3) a boron halide or alkylaluminum modifier, and
(4) a silicon containing molecular weight distribution (MWD) regulator having the formula $(RO)_nSiR^1_{(4-n)}$, wherein R, R$^1$ and n are as defined above.

The vanadium trihalide which is reacted with the electron donor in the preparation of catalyst component (A) is preferable vanadium trichloride, although the halogen present in said vanadium trihalide may be chlorine, bromine or iodine, or any mixture thereof.

The electron donor employed is a liquid, organic Lewis base in which the vanadium trihalide is soluble. Suitable electron donors include alkyl esters of aliphatic and aromatic carboxylic acids, aliphatic ketones, aliphatic amines, aliphatic alcohols, aliphatic ethers and cycloaliphatic ethers. Particularly useful are alkyl esters of aliphatic carboxylic acids containing from 1 to 4 carbon atoms; alkyl esters of aromatic carboxylic acids containing from 7 to 8 carbon atoms; aliphatic ketones containing from 3 to 6 carbon atoms, preferably from 3 to 4 carbon atoms; aliphatic amines containing from 1 to 14 carbon atoms, preferably from 2 to 8 carbon atoms; aliphatic alcohols containing from 1 to 8 carbon atoms, preferably from 2 to 8 carbon atoms; aliphatic ethers containing from 2 to 8 carbon atoms, preferably from 4 to 5 carbon atoms; and cycloaliphatic ethers containing from 4 to 5 carbon atoms, preferably mono- or di- ethers containing 4 carbon atoms. The aliphatic and cycloaliphatic ethers are most preferred, particularly tetrahydrofuran. If desired, these electron donors may be substituted with one or more substituents which are inert under the reaction conditions employed during reaction with the vanadium trihalide, as well as during preparation of and polymerization with catalyst component (A).

The modifier employed in the preparation of catalyst component (A) is a boron halide or alkylaluminum compound having the formula:

$$MX_a$$

wherein:
M is boron or AlR$^2_{(3-a)}$ wherein each R$^2$ is an alkyl radical containing from 1 to 14 carbon atoms, which radicals may be the same or different,
X is selected from the group consisting of fluorine, chlorine, bromine and iodine, and mixtures thereof, and
a is an integer having a value of 0, 1 or 2, provided that a is 3 when M is boron.

Preferably any halide present in the modifier is chlorine, and any alkyl radicals present contain from 1 to 6 carbon atoms. Such alkyl radicals may be cyclic, branched or straight chain, and may be substituted with one or more substituents which are inert under the reaction conditions employed during preparation of and polymerization with catalyst component (A). Diethylaluminum chloride is preferred.

The silicon-containing compound employed to treat catalyst component (A) so as to regulate the molecular weight distribution (MWD) of the polymers produced with the catalyst of the present invention has the formula:

wherein:
R is a monovalent hydrocarbon radical free of aliphatic unsaturation containing from 1 to 14 carbon atoms,
R$^1$ is a monovalent hydrocarbon radical free of aliphatic unsaturation containing from 1 to 14 carbon atoms, and
n is an integer having a value of from 1 to 4

R and R$^1$ are usually alkyl radicals containing from 1 to 14 carbon atoms, preferably from 1 to 6 carbon atoms, or aryl radicals containing from 6 to 14 carbon atoms, preferably 6 carbon atoms.

Any or all of R and R$^1$ may be substituted with one or more substituents which are inert under the reaction conditions employed during treatment of and polymerization with catalyst component (A).

The silicon-containing compounds which can be employed to treat catalyst component (A) include tetramethoxysilane, methyltrimethoxysilane, dimethyldimethoxysilane, diisobutyldimethoxysilane, diphenyldimethoxysilane, tetraethoxysilane, dimethyldiethoxysilane, diethyldiethoxysilane, phenyltriethoxysilane and diphenyldiethoxysilane.

A solid, particulate, porous, inorganic material is employed as carrier in the preparation of catalyst component (A). The carrier serves as support for the vanadium trihalide/electron donor reaction product, the boron halide or alkylaluminum modifier, and the silicon containing molecular weight distribution (MWD) regulator. Suitable carriers include inorganic materials, such as oxides of silicon, aluminum and zirconium, as well as phosphates of aluminum. Usually these materials have an average particle size of from about 10 microns to about 250 microns, preferably from about 20 microns to about 150 microns, and a surface area of at least 3 square meters per gram, preferably at least 50 square meters per gram. Polymerization activity of the catalyst, i.e., productivity, can be improved by employing a silica support having an average pore size of at least 80 Angstrom units, preferably at least 100 Angstrom units. The carrier material should be dry, that is, free of absorbed water. Drying of the carrier material can be effected by heating, e.g., at a temperature of at least 600° C. when silica is employed as the support.

Catalyst component (A) is prepared by treating a solid, particulate, porous, inorganic carrier with:
(1) the reaction product of (a) a vanadium trihalide and (b) an electron donor,
(2) a boron halide or alkylaluminum modifier, and
(3) an silicon-containing molecular weight distribution (MWD) regulator having the formula $(RO)_n\text{-}SiR^1_{(4-n)}$, wherein R, $R^1$ and n are as defined above.

The vanadium trihalide/electron donor reaction product is prepared by dissolving at least one vanadium trihalide in at least one electron donor at a temperature of from about 20° C. up to the boiling point of the electron donor. Dissolution of the vanadium trihalide in the electron donor can be facilitated by stirring, and in some instances by refluxing, the vanadium trihalide in the electron donor. Up to several hours of heating may be required to complete dissolution.

After the vanadium trihalide has been dissolved in the electron donor, the reaction product is impregnated into the carrier. Impregnation may be effected by adding the carrier to the solution of the vanadium trihalide in the electron donor, and then drying the mixture to remove excess electron donor. The carrier may be added alone as a dry powder or, if desired, as a slurry in additional electron donor. Ordinarily the carrier and the solution of the vanadium trihalide in the electron donor are mixed together in such amounts that, after drying, the carrier contains from about 0.05 mmoles to about 0.6 mmoles of vanadium per gram, preferably from about 0.3 mmoles to about 0.6 mmoles of vanadium per gram, and most preferably from about 0.3 mmoles to about 0.5 mmoles of vanadium per gram. The impregnated vanadium trihalide/electron donor reaction product prepared in this manner contains from about 1 mole to about 5 moles, preferably from about 2 moles to about 4 moles, and most preferably about 3 moles of electron donor per mole of vanadium trihalide. Excess electron donor not actually complexed with the vanadium trihalide may remain adsorbed on the carrier without ill effects.

The boron halide or alkylaluminum modifier is usually added to the carrier after it has been impregnated with the vanadium trihalide/electron donor reaction product. However, if desired, the boron halide or alkylaluminum modifier may be added to the carrier before it is impregnated with the vanadium trihalide/electron donor reaction product. Addition of the modifier to the carrier may be effected by dissolving one or more modifiers in one or more inert liquid solvents capable of dissolving the modifier, immersing the carrier in the solution, and then drying the mixture to remove the solvent. If the modifier is applied subsequent to the vanadium trihalide/electron donor reaction product, the solvent must be one which does not dissolve the vanadium trihalide/electron donor reaction product. The carrier may be added to the solution of the modifier alone as a dry powder or, if desired, as a slurry in additional inert liquid solvent. Alternatively, the modifier may be added to a slurry of the carrier in the inert liquid solvent. Usually the modifier is added to the slurry dissolved in additional inert liquid solvent, although this is not necessary. Ordinarily the carrier and the solution of the modifier in the inert liquid solvent are mixed together in such amounts that, after drying, the carrier contains from about 0.1 mole to about 10 moles, preferably from about 0.2 mole to about 2.5 moles, of modifier per mole of electron donor in the vanadium trihalide/electron donor reaction product present in the carrier (or to be added to the carrier if it is applied subsequent to the modifier).

Among the solvents which can be employed to dissolve the boron halide or alkylaluminum modifier are hydrocarbon solvents such as isopentane, hexane, heptane, toluene, xylene and naphtha.

Addition of the silicon containing compound to the carrier may be effected in the same manner as addition of the modifier, i.e., by dissolving one or more silicon containing compounds in one or more inert liquid solvents capable of dissolving the silicon-containing compound, immersing the carrier in the solution, and drying the mixture to remove the solvent. If the silicon containing compound is applied subsequent to the vanadium trihalide/electron donor reaction product, the solvent must be one which does not dissolve the vanadium trihalide/electron donor reaction product. While the silicon-containing compound is usually applied separately, for convenience it may be applied together with the modifier in a single solution, provided that the modifier and silicon-containing compound employed are not reactive with each other. In any case, the carrier may be added to the solution of the silicon-containing compound alone as a dry powder or, if desired, as a slurry in additional inert liquid solvent. Alternatively, the silicon-containing compound may be added to a slurry of the carrier in the inert liquid solvent. Usually the silicon containing compound is added to the slurry dissolved in additional inert liquid solvent, although this is not necessary.

The amount of silicon-containing compound employed in the preparation of catalyst component (A) depends upon the particular silicon-containing compound employed and the molecular weight distribution desired in the polymers to be produced with the treated catalyst Catalysts of the type employed herein which have not been treated with a silicon-containing compound have been found to produce polymers having a molecular weight distribution $(M_w/M_n)$ in excess of 10 up to about 22. This corresponds to a melt flow ratio (MFR) in excess of 60 up to about 130. By treating such catalysts with the silicon containing compounds described herein, however, it is possible to lower the melt flow ratio (MFR) of the polymers produced up to as much as 50 percent, depending upon the amount of silicon-containing compound employed. Reductions of up to 50 percent in melt flow ratio (MFR) usually require a molar ratio of silicon-containing compound to vanadium trihalide/electron donor reaction product of from about 1:1 to about 15:1, preferably from about 2:1 to about 10:1. Lesser amounts of silicon-containing compound bring about lesser reductions in melt flow ratio (MFR). However, greater amounts of silicon-containing compound have not been found to provide any further reduction in melt flow ratio (MFR). Generally, the silicon-containing compound is employed in amounts such as to provide a molar ratio of silicon containing compound to vanadium trihalide/electron donor reaction product of from about 0.1:1 to about 30:1, preferably from about 0.2:1 to about 10:1, depending upon the desired result.

As previously disclosed, it is also possible to regulate the molecular weight of the polymers produced by the use of a suitable chain transfer agent, such as hydrogen, during polymerization. Generally, hydrogen is employed and added to the reactor in an amount sufficient to produce a hydrogen : ethylene mol ratio of from about 0.00001:1 to about 0.5:1, depending upon the melt index desired in the polymer product. In addition to hydrogen, other chain transfer agents may be employed to regulate the molecular weight of the polymers.

The ability to regulate the molecular weight distribution of the polymers over a broad molecular weight range allows polymer properties to be tailored for use in multifarious applications and greatly increases the versatility of the catalyst system.

Component (B) of the catalyst system of the present invention is an alkylaluminum cocatalyst having the formula $$Al(R^3)_3$$

wherein $R^3$ is a saturated hydrocarbon radical containing from 1 to 14 carbon atoms, which radicals may be the same or different. Such radicals may be substituted with one or more substituents which are inert under the reaction conditions employed during polymerization. Preferably $R^3$ is an alkyl radical containing from 2 to 8 carbon atoms.

Component (C) of the catalyst system of the present invention is a halohydrocarbon polymerization promoter having the formula $$R^4{}_bCX'_{(4-b)}$$

wherein:
$R^4$ is hydrogen or an unsubstituted or halosubstituted alkyl radical containing from 1 to 6 carbon atoms, which radicals may be the same or different,
X' is halogen, and
b is 0, 1 or 2.

Preferred promoters include flouro-, chloro- or bromo substituted ethane or methane having at least 2 halogens attached to a single carbon atom. Preferred promoters include $CCl_4$, $CHCl_3$, $CH_2Cl_2$, $CBr_4$, $CFCl_3$, $CH_3CCl_3$, and $CF_2ClCCl_3$. Particularly preferred promoters are $CH_3CCl_3$, $CFCl_3$, and $CHCl_3$.

Polymerization is effected, with the catalyst system of the present invention by contacting ethylene, or a mixture of ethylene and at least one alpha-olefin having 3 to 8 carbon atoms, with the three components of the catalyst system, i.e., the solid catalyst precursor (treated with the silicon-containing compound), the alkylaluminum cocatalyst, and the halohydrocarbon polymerization promoter. While polymerization can be effected employing either solution, slurry or gas phase techniques, it is preferably effected in a fluid bed reaction system. Suitable fluid bed reaction systems are described, e.g., in U.S. Pat. No. 4,302,565, 4,302,566 and 4,303,771, the disclosures of which are incorporated herein by reference.

The solid catalyst precursor, cocatalyst and polymerization promoter can be introduced into the polymerization reactor through separate feed lines or, if desired, two or all of the components may be partially or completely mixed with each other before they are introduced into the reactor. In any event, the cocatalyst and polymerization promoter are employed in such amounts as to provide a molar ratio of the promoter to the alkylaluminum cocatalyst of from about 0.1:1 to about 10:1, preferably from about 0.2:1 to about 2:1, and the cocatalyst and the solid catalyst precursor are employed in such amounts as to provide an atomic ratio of aluminum in the cocatalyst to vanadium in the precursor of from about 10:1 to about 400:1, preferably from about 15:1 to about 60:1.

Both the cocatalyst and the polymerization promoter may be introduced into the reactor dissolved in an inert liquid solvent, i.e., a solvent which is nonreactive with all the components of the catalyst system as well as all the components of the reaction system. Hydrocarbons such as isopentane, hexane, heptane, toluene, xylene, naphtha and mineral oil are preferred for this purpose. Generally, such solutions contain from 1 weight percent to 75 weight percent of the cocatalyst and/or the polymerization promoter. If desired, less concentrated or more concentrated solutions can be employed, or, alternatively, the cocatalyst and polymerization promoter can be added in the absence of solvent, or, if desired, suspended in a stream of liquified monomer. When a solvent is employed and polymerization is conducted in a fluid bed, the amount of solvent introduced into the reactor should be carefully controlled so as to avoid the use of excessive quantities of liquid which would interfere with the operation of the fluidized bed.

The solvents employed to dissolve the cocatalyst and the polymerization promoter may also be employed to introduce the solid catalyst precursor into the reactor. Higher boiling solvents, such as mineral oil, are preferred for this purpose. While the solid catalyst precursor may also be introduced into the reactor in the absence of solvent or suspended in liquified monomer, such solvents may be employed to disperse the solid catalyst precursor and facilitate its flow into the reactor. Such dispersions generally contain from 1 weight percent to 75 weight percent of the solid precursor.

The alpha-olefins which may be polymerized with ethylene contain from 3 to 8 carbon atoms per molecule. These alpha olefins should not contain any branching or any of their atoms closer than two carbon atoms removed from the double bond. Suitable alpha-olefins include propylene, butene-1, pentene-1, hexene-1, 4-methyl pentene-1, heptene-1 and octene-1.

The temperature employed can vary from about 10° C. to about 115° C., preferably from about 80° C. to about 110° C., when polymerization is effected in gas phase or in a slurry, and from about 150° C. to about 250° C. when polymerization is effected in a solution. When polymerization is conducted in a fluid bed, the temperature, of course, must be maintained below the sintering temperature of the polymers produced in order to prevent polymer agglomeration.

The pressure employed can vary from subatmospheric to superatmospheric. Pressures of up to about 7000 kPa, preferably of from about 70 kPa to about 3500 kPa, are suitable for gas phase, slurry and solution polymerizations.

If desired, polymerization may be conducted in the presence of an inert gas, i.e., a gas which is nonreactive under the conditions employed during polymerization. The reactor should, however, be maintained substantially free of undesirable catalyst poisons, such as moisture, oxygen, carbon monoxide, carbon dioxide, acetylene, and the like.

When polymerization is conducted in a fluid bed, the superficial gas velocity of the gaseous reaction mixture through the bed must exceed the minimum flow required for fluidization in order to maintain a viable fluidized bed.

The following Examples are designed to illustrate the process of the present invention and are not intended as a limitation upon the scope thereof.

The properties of the polymers produced in the Examples were determined by the following test methods:

Density

A plaque is made and conditioned for one hour at 120° C. to approach equilibrium crystallinity and is then quickly cooled to room temperature. Measurement for density is then made in a density gradient column, and density values are reported as grams/cm$^3$.

Melt Index (MI)

ASTM D-1238, Condition E. Measured at 190° C. and reported as grams per 10 minutes.

Flow Index (FI)

ASTM D-1238, Condition F. Measured at 10 times the weight used in the melt index text above.

Melt Flow Ratio (MFR)

Ratio of Flow Index : Melt Index.

Activity

Activity values are normalized values based upon grams of polymer produced per mmol of vanadium in the catalyst per hour per 100 psi of ethylene polymerization pressure.

Example 1

Impregnation of Carrier with VCl$_3$/THF Reaction Product

To a flask equipped with a mechanical stirrer were added 4 liters of anhydrous tetrahydrofuran (THF), followed by 50 grams (0.318 mole) of solid VCl$_3$. The mixture was heated under nitrogen at a temperature of 65° C. for 5 hours with continuous stirring in order to completely dissolve the VCl$_3$.

Eight hundred grams (800g) of silica gel were dehydrated by heating under nitrogen at a temperature of 600° C. for 20 hours. The dehydrated gel was added to the solution prepared as above, and the mixture was refluxed for one hour under nitrogen. At the end of this time, the mixture was heated at a temperature of 55° C. for about 6 hours under a purge of dry nitrogen to produce a dry, free-flowing powder containing about 8 weight percent THF.

Example 2

Treatment of Carrier with Diethylaluminum Chloride

Five hundred grams (500g) of the silica carrier impregnated with VCl$_3$/THF reaction product in accordance with Example 1 were slurried in 4 liters of anhydrous hexane. The slurry was continuously stirred while a 10 weight percent solution of diethylaluminum chloride in anhydrous hexane was added over a period of 30 minutes. The impregnated carrier and the diethylaluminum chloride solution were employed in amounts that provided a desired atomic ratio of aluminum to vanadium. After addition of the diethylaluminum chloride solution was complete, the mixture was heated at a temperature of 45° C. for about 6 hours under a purge of dry nitrogen to produce a dry, free-flowing powder.

Example 3

Treatment of Carrier with MWD Regulator

Five grams (5.0g) of the silica carrier treated with diethylaluminum chloride in accordance with Example 2 were slurried in 30 ml of anhydrous hexane. The slurry was continuously stirred while a one molar solution of a silicon-containing molecular weight distribution (MWD) regulator in anhydrous hexane was added over a period of 5 minutes. After addition of the solution was complete, the mixture was stirred for an additional 30-60 minutes. At the end of this time, the mixture was heated at a temperature of 50° C. either under vacuum or under a purge of dry nitrogen to remove the hexane diluent and produce a free-flowing powder.

The procedure was repeated a number of times with various silicon containing MWD regulators.

Table I below sets forth the particular silicon-containing MWD regulators employed in each of these experiments, as well as the molar ratio of MWD regulator to vanadium present in the treated carrier.

TABLE I

| Example 3 | MWD Regulator | Mol. Ratio MWD Regulator to V in Treated Carrier |
|---|---|---|
| (a) | tetraethoxysilane | 3.0 |
| (b) | tetraethoxysilane | 4.0 |
| (c) | tetraethoxysilane | 4.2 |
| (d) | diethyldiethoxysilane | 6.0 |
| (e) | diisobutyldimethoxysilane | 4.2 |
| (f) | diphenyldimethoxysilane | 4.5 |

EXAMPLES 4–12

Copolymerization of Ethylene With Hexene-1

The solid catalyst components prepared as described in Example 3 were employed together with an alkylaluminum compound, as cocatalyst, and a halohydrocarbon compound (CFCl$_3$), as polymerization promoter, to copolymerize ethylene and hexene-1 in a one-liter autoclave reactor.

In each polymerization, the three catalyst components were pre-mixed in a 6 ounce bottle containing 100 ml of hexane before being added to the reactor. Twenty milliliters (20.0 ml) of hexene-1 were added to the pre-mixed catalyst components before the resulting mixture was transferred to the reactor. Anhydrous conditions were maintained at all times.

The polymerization reactor was dried by heating at 96° C. under a stream of dry nitrogen for 40 minutes. After cooling the reactor to 50° C., 500 ml of hexane were added to the reactor, and the reactor contents were stirred under a gentle flow of nitrogen. The pre-mixed catalyst components were then transferred to the reactor under a stream of nitrogen and the reactor was sealed. The temperature of the reactor was gradually raised to 60° C. and the reactor was pressurized with hydrogen to a pressure of 10 kPa. The temperature was then raised to 75° C. and the reactor was pressurized to 1050 kPa with ethylene. Heating was continued until the desired polymerization temperature of 85° C. was attained. Polymerization was allowed to continue for 30 minutes, during which time ethylene was continually added to the reactor to maintain the pressure constant. At the end of 30 minutes, the reactor was vented and opened.

Table III below sets forth the details involving the composition of the catalysts employed in these polymerizations, as well as the reaction conditions employed during polymerization, the properties of the polymers produced, and the productivity of each catalyst system.

Shorthand designations employed in Table III are defined as follows:

Table III below along with the details of Examples 4–12.

TABLE III

| EXAMPLE | Comp. Exp. A | 4 | Comp. Exp. B | 5 | Comp. Exp. C | 6 | 7 | 8 |
|---|---|---|---|---|---|---|---|---|
| Catalyst | | | | | | | | |
| Carrier | $SiO_2$ | $SiO_2$ | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF | $VCl_3$/THF | $VCl_3$/THF |
| Modifier | DEAC | DEAC | DEAC | DEAC | DEAC | DEAC | DEAC | DEAC |
| Modifier/V Ratio | 1.1 | 1.1 | 1.1 | 1.1 | 1.5 | 1.5 | 1.5 | 1.5 |
| MWD Regulator | — | TEOS | — | TEOS | — | TEOS | DEDEOS | DIBDMS |
| MWD Regulator/V Ratio | — | 4.2 | — | 4.2 | — | 4.0 | 6.0 | 4.2 |
| Cocatalyst | TEAL | TEAL | TIBA | TIBA | TEAL | TEAL | TEAL | TEAL |
| Al/V Ratio | 40 | 40 | 40 | 40 | 40 | 40 | 40 | 40 |
| Promoter | $CFCl_3$ | $CFCl_3$ | $CFCl_3$ | $CFCl_3$ | $CFCl_3$ | $CFCl_3$ | $CFCl_3$ | $CFCl_3$ |
| Promoter/Al Ratio | 1.0 | 1.0 | 1.0 | 1.0 | 1.0 | 1.0 | 1.0 | 1.0 |
| Reaction Conditions | | | | | | | | |
| Temperature, °C. | 85 | 85 | 85 | 85 | 85 | 85 | 85 | 85 |
| Pressure, kPa | 1050 | 1050 | 1050 | 1050 | 1050 | 1050 | 1050 | 1050 |
| Reaction Time, minutes | 30 | 30 | 30 | 30 | 30 | 30 | 30 | 30 |
| Polymer Properties | | | | | | | | |
| Density, g/cm$^3$ | 0.952 | 0.948 | — | 0.955 | — | — | — | — |
| Melt Index, g/10 min. | 1.2 | 2.1 | — | 0.3 | 1.4 | 4.6 | 3.1 | 2.6 |
| Flow Index, g/10 min. | 90 | 111 | 2.7 | 25 | 99 | 212 | 149 | 117 |
| Melt Flow Ratio | 75 | 53 | — | 83 | 71 | 46 | 48 | 45 |
| Activity | | | | | | | | |
| g polymer/mmol V-Hr-100 psi $C_2H_4$ | 820 | 1458 | 1203 | 1726 | 1528 | 2362 | 2487 | 1684 |
| Activity Increase vs. Control, % | — | 78 | — | 43 | — | 52 | 63 | 10 |

| EXAMPLE | 9 | Comp. Exp. D | 10 | Comp. Exp. E | 11 | Comp. Exp. F | 12 |
|---|---|---|---|---|---|---|---|
| Catalyst | | | | | | | |
| Carrier | $SiO_2$ | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF | $VCl_3$/THF |
| Modifier | DEAC | DEAC | DEAC | DEAC | DEAC | DEAC | DEAC |
| Modifier/V Ratio | 1.5 | 1.5 | 1.5 | 4.5 | 4.5 | 4.5 | 4.5 |
| MWD Regulator | DPDMS | — | DPDMS | — | TEOS | — | TEOS |
| MWD Regulator/V Ratio | 4.5 | — | 4.5 | — | 3.0 | — | 3.0 |
| Cocatalyst | TEAL | TIBA | TIBA | TEAL | TEAL | TIBA | TIBA |
| Al/V Ratio | 40 | 40 | 40 | 40 | 40 | 40 | 40 |
| Promoter | $CFCl_3$ | $CFCl_3$ | $CFCl_3$ | $CFCl_3$ | $CFCl_3$ | $CFCl_3$ | $CFCl_3$ |
| Promoter/Al Ratio | 1.0 | 1.0 | 1.0 | 1.0 | 1.0 | 1.0 | 1.0 |
| Reaction Conditions | | | | | | | |
| Temperature, °C. | 85 | 85 | 85 | 85 | 85 | 85 | 85 |
| Pressure, kPa | 1050 | 1050 | 1050 | 1050 | 1050 | 1050 | 1050 |
| Reaction Time, minutes | 30 | 30 | 30 | 30 | 30 | 30 | 30 |
| Polymer Properties | | | | | | | |
| Density, g/cm$^3$ | — | — | — | 0.945 | 0.944 | 0.946 | 0.947 |
| Melt Index, g/10 min. | 1.9 | 0.5 | 3.3 | 1.2 | 2.9 | 8.0 | 2.3 |
| Flow Index, g/10 min. | 74 | 49 | 172 | 76 | 156 | 536 | 140 |
| Melt Flow Ratio | 39 | 97 | 52 | 63 | 55 | 67 | 61 |
| Activity | | | | | | | |
| g polymer/mmol V-Hr-100 psi $C_2H_4$ | 1826 | 1964 | 2758 | 2476 | 3407 | 4441 | 5100 |
| Activity Increase vs. Control, % | 20 | — | 40 | — | 37 | — | 15 |

| Designation | Definition |
|---|---|
| THF | Tetrahydrofuran |
| DEAC | Diethylaluminum chloride |
| TEAL | Triethylaluminum |
| TIBA | Triisobutylaluminum |
| TEOS | tetraethoxysilane |
| DEDEOS | diethyldiethoxysilane |
| DIBDMS | diisobutyldimethoxysilane |
| DPDMS | diphenyldimethoxysilane |

COMPARATIVE EXAMPLES A-F

For comparative purposes, ethylene was copolymerized with hexene 1 as in Examples 4–12 employing the solid catalyst components prepared in accordance with Example 2, i.e., the catalyst components employed had not been treated with the MWD regulator as in Example 3. The details of this polymerization are set forth in Table III below along with the details of Examples 4-12.

EXAMPLES 13-17

Homopolymerization of Ethylene

The solid catalyst components prepared as described in Example 3 were employed together with an alkylaluminum compound (triethylaluminum), as cocatalyst, and a halohydrocarbon compound ($CFCl_3$), as polymerization promoter, to homopolymerize ethylene in a one-liter autoclave reactor.

The procedure employed was identical to that of Examples 4–12 except that hexene-1 was not employed.

Table IV below sets forth the details involving the composition of the catalysts employed in these polymerizations, as well as the reaction conditions employed during polymerization, the properties of the polymers produced, and the productivity of each catalyst system.

Comparative Examples G–H

For comparative purposes, ethylene was homopolymerized as in Examples 13-17 employing the solid catalyst components prepared in accordance with Example 2, i.e., the catalyst components employed had not been treated with the MWD regulator as in Example 3. The details of these polymerizations are set forth in Table IV below along with the details of Examples 13-17.

Shorthand designations employed in Table IV are the same as those employed in Table III.

TABLE IV

| EXAMPLE | Comp. Exp. G | 13 | Comp. Exp. H | 14 | 15 | 16 | 17 |
|---|---|---|---|---|---|---|---|
| Catalyst | | | | | | | |
| Carrier | $SiO_2$ | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF | $VCl_3$/THF |
| Modifier | DEAC | DEAC | DEAC | DEAC | DEAC | DEAC | DEAC |
| Modifier/V Ratio | 1.1 | 1.1 | 1.5 | 1.5 | 1.5 | 1.5 | 1.5 |
| MWD Regulator | — | TEOS | — | TEOS | DEDEOS | DIBDMS | DPDMS |
| MWD Regulator/V Ratio | — | 4.2 | — | 4.0 | 6.0 | 4.2 | 4.5 |
| Cocatalyst | TEAL | TEAL | TEAL | TEAL | TEAL | TEAL | TEAL |
| Al/V Ratio | 40 | 40 | 40 | 40 | 40 | 40 | 40 |
| Promoter | $CFCl_3$ | $CFCl_3$ | $CFCl_3$ | $CFCl_3$ | $CFCl_3$ | $CFCl_3$ | $CFCl_3$ |
| Promoter/Al Ratio | 1.0 | 1.0 | 1.0 | 1.0 | 1.0 | 1.0 | 1.0 |
| Reaction Conditions | | | | | | | |
| Temperature, °C. | 85 | 85 | 85 | 85 | 85 | 85 | 85 |
| Pressure, kPa | 1050 | 1050 | 1050 | 1050 | 1050 | 1050 | 1050 |
| Reaction Time, minutes | 30 | 30 | 30 | 30 | 30 | 30 | 30 |
| Polymer Properties | | | | | | | |
| Density, g/cm$^3$ | — | 0.963 | — | — | — | — | — |
| Melt Index, g/10 min. | 0.3 | 0.9 | 2.3 | 3.9 | 1.8 | 3.2 | 8.2 |
| Flow Index, g/10 min. | 21 | 52 | 129 | 187 | 77 | 96 | 197 |
| Melt Flow Ratio | 70 | 58 | 56 | 48 | 43 | 30 | 24 |
| Activity | | | | | | | |
| g polymer/mmol V-Hr-100 psi $C_2H_4$ | 668 | 1247 | 802 | 1322 | 1311 | 1331 | 1194 |
| Activity Increase vs. Control, % | — | 87 | — | 65 | 63 | 66 | 49 |

We claim:
1. A solid catalyst precursor consisting of:
   (1) a solid, particulate, porous, inorganic carrier, as support for
   (2) the reaction product of (a) a vanadium trihalide and (b) an electron donor,
   (3) a boron halide or alkylaluminum modifier, and
   (4) a silicon containing molecular weight distribution regulator having the formula

$(RO)_n SiR^1_{(4-n)}$ wherein:
   R is a monovalent hydrocarbon radical free of aliphatic unsaturation containing from 1 to 14 carbon atoms,
   $R^1$ is a monovalent hydrocarbon radical free of aliphatic unsaturation containing from 1 to 14 carbon atoms, and
   n is an integer having a value of from 1 to 4.

2. A solid catalyst precursor as in claim 1 wherein R and $R^1$ are alkyl radicals containing from 1 to 6 carbon atoms or aryl radicals containing 6 carbon atoms.

3. A solid catalyst precursor as in claim 2 wherein the silicon containing molecular weight distribution regulator is tetraethoxysilane.

4. A solid catalyst precursor as in claim 2 wherein the silicon-containing molecular weight distribution regulator is diethyldiethoxysilane.

5. A solid catalyst precursor as in claim 2 wherein the silicon-containing molecular weight distribution regulator is diisobutyldimethoxysilane.

6. A solid catalyst precursor as in claim 2 wherein the silicon containing molecular weight distribution regulator is diphenyldimethoxysilane.

7. A catalyst system comprising:
   (A) the solid catalyst precursor of claim 1,
   (B) an alkylaluminum cocatalyst having the formula $Al(R^3)_3$ wherein:
   $R^3$ is a saturated hydrocarbon radical containing from 1 to 14 carbon atoms, and
   (C) a halohydrocarbon polymerization promoter having the formula $(R^4)_b CX'_{(4-b)}$ wherein:
   $R^4$ is hydrogen or an unsubstituted or halosubstituted alkyl radical containing from 1 to 6 carbon atoms,
   X' is halogen, and
   b is 0, 1 or 2.

8. A catalyst system as in claim 7 wherein R and $R^1$ are alkyl radicals containing from 1 to 6 carbon atoms or aryl radicals containing 6 carbon atoms.

9. A catalyst system as in claim 8 wherein the silicon containing molecular weight distribution regulator is tetraethoxysilane.

10. A catalyst system as in claim 8 wherein the silicon-containing molecular weight distribution regulator is diethyldiethoxysilane.

11. A catalyst system as in claim 8 wherein the silicon containing molecular weight distribution regulator is diisobutyldimethoxysilane.

12. A catalyst system as in claim 8 wherein the silicon containing molecular weight distribution regulator is diphenyldimethoxysilane.

13. In a catalyst system comprising
   (A) a solid catalyst precursor consisting of
      (1) a solid, particulate, porous, inorganic carrier, as support for (2) the reaction product of (a) a vanadium trihalide and (b) an electron donor, and (3) a boron halide or alkylaluminum modifier, (B) an alkylaluminum cocatalyst, and (C) a halohydrocarbon polymerization promoter, the improvement wherein the solid catalyst precursor (A) is treated with a silicon containing molecular weight distribution regulator having the formula $(RO)_n SiR^1_{(4-n)}$ wherein:

R is a monovalent hydrocarbon radical free of aliphatic unsaturation containing from 1 to 14 carbon atoms, $R^1$ is a monovalent hydrocarbon radical free of aliphatic unsaturation containing from 1 to 14 carbon atoms, and n is an integer having a value of from 1 to 4.

14. A catalyst system as in claim 13 wherein R and $R^1$ are alkyl radicals containing from 1 to 6 carbon atoms or aryl radicals containing 6 carbon atoms.

15. A catalyst system as in claim 14 wherein the silicon containing molecular weight distribution regulator is tetraethoxysilane.

16. A catalyst system as in claim 14 wherein the silicon containing molecular weight distribution regulator is diethyldiethoxysilane.

17. A catalyst system as in claim 14 wherein the silicon-containing molecular weight distribution regulator is diisobutyldimethoxysilane.

18. A catalyst system as in claim 14 wherein the silicon-containing molecular weight distribution regulator is diphenyldimethoxysilane.

* * * * *